United States Patent [19]

Russo

[11] Patent Number: 5,120,169
[45] Date of Patent: Jun. 9, 1992

[54] BLIND FASTENER

[75] Inventor: Thomas R. Russo, Bristol, Conn.

[73] Assignee: Emhart Inc., Newark, Del.

[21] Appl. No.: 773,713

[22] Filed: Oct. 9, 1991

[51] Int. Cl.⁵ .............................................. F16B 13/04
[52] U.S. Cl. ............................................ 411/34; 411/38
[58] Field of Search ....................... 411/34, 35, 36, 37,
411/38, 183, 182, 172, 174, 367

[56] References Cited
U.S. PATENT DOCUMENTS

| | | | |
|---|---|---|---|
| 2,125,018 | 7/1938 | Hamill | 411/36 |
| 2,525,736 | 10/1950 | Taylor | 411/34 |
| 3,017,800 | 1/1962 | Cohen | 411/34 |
| 3,348,444 | 10/1967 | Brignola | 411/38 |
| 3,834,270 | 9/1974 | Triplett et al. | 411/38 |
| 4,776,737 | 10/1988 | Wollar | 411/38 |
| 5,051,636 | 9/1991 | Ishimoto et al. | 411/34 X |

FOREIGN PATENT DOCUMENTS

| | | | |
|---|---|---|---|
| 161916 | 11/1985 | European Pat. Off. | 411/34 |
| 704510 | 2/1954 | United Kingdom | 411/34 |

Primary Examiner—Rodney M. Lindsey
Attorney, Agent, or Firm—Spencer T. Smith

[57] ABSTRACT

A blind insert having a compressible plastic bushing having a flange at one end which merges into a first cylindrical portion and a second reduced diameter cylindrical portion at the other end. A metallic end cap is secured on the free end of the plastic bushing and is spaced from the first cylindrical portion and the dimension of the first and second cylindrical portions are selected so that as a screw is inserted into the fastener the first cylindrical portion will bulge outwardly and rearwardly to extend over the open end of the cap to forcefully center the cap to prevent tearing of the bushing.

2 Claims, 1 Drawing Sheet

BLIND FASTENER

The present invention relates to blind fasteners which have a bushing of tough neoprene having a flange at one end. To establish a strong leakproof fastening a screw which engages a nut captive within the bushing bore at the free end of the sleeve is tightened. The bushing expands effecting a secure fastening.

Such blind fasteners are expensive to manufacture since the nut is expensive and since the neoprene bushing has to be formed with the nut embedded in it.

It is accordingly an object of the present invention to provide an improved blind fastener which utilizes such a neoprene bushing having a flange at one end.

Other objects and advantages of the present invention will become apparent from the following portion of this specification and from the accompanying drawings which illustrate in accordance with the mandate of the patent statutes a presently preferred embodiment incorporating the principles of the invention.

Referring to the drawings.

Figure 1:
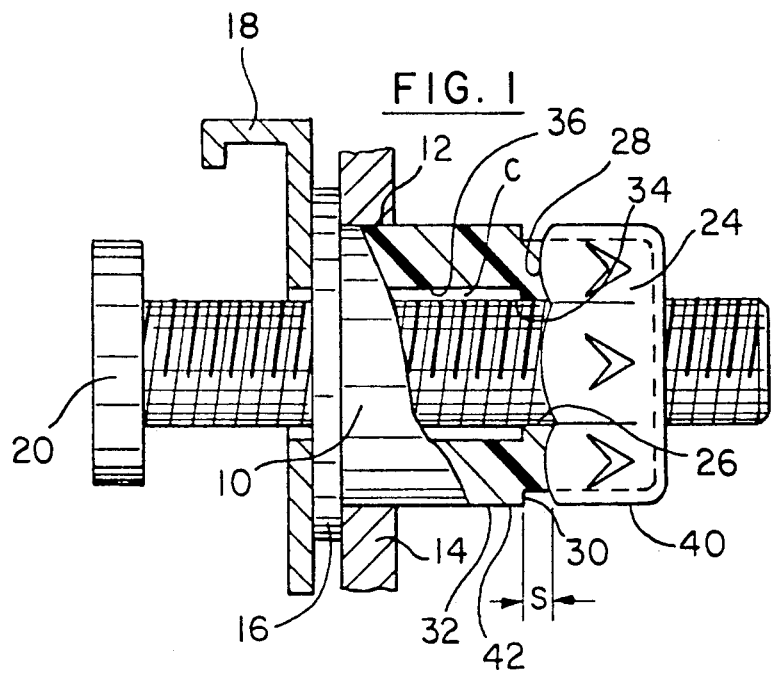
FIG. 1 is a side view of the blind fastener made in accordance with the teachings of the present invention with a screw fully inserted but prior to operating the fastener.
Figure 2:
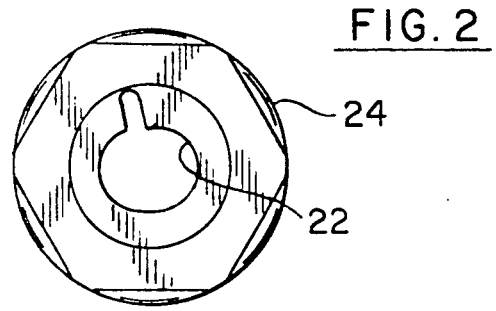
FIG. 2 is a end view of the cap of the fastener.

The bushing 10 which is made from tough neoprene, EPDM, Nitrile or Buna N, for example, is inserted in a pre-drilled hole 12 in a thin walled member 14 with its flange 16 against the outer surface of the wall. The part 18 to be assembled to the surface of the wall is placed against the flange 16 and is secured by a machine screw 20 which extends through the bushing. The screw is threadedly received by a stamped opening 22 of a metal end cap 24 which fits over the reduced diameter end portion 26 of the bushing 10. Before the screw is tightened to compress the bushing (FIG. 1) a selected spacing S exists between the open end 28 of the cap 24 and the opposed bushing surface 30 which joins the large diameter section 32 of the bushing to the small diameter end portion 26.

The inner diameter 34 of the reduced diameter bushing portion 26 approximately corresponds to the outer diameter of the screw 20 and an annular clearance C is defined between the inner diameter 36 of the large diameter bushing portion 32 and the outer diameter of the screw.

Figure 3:
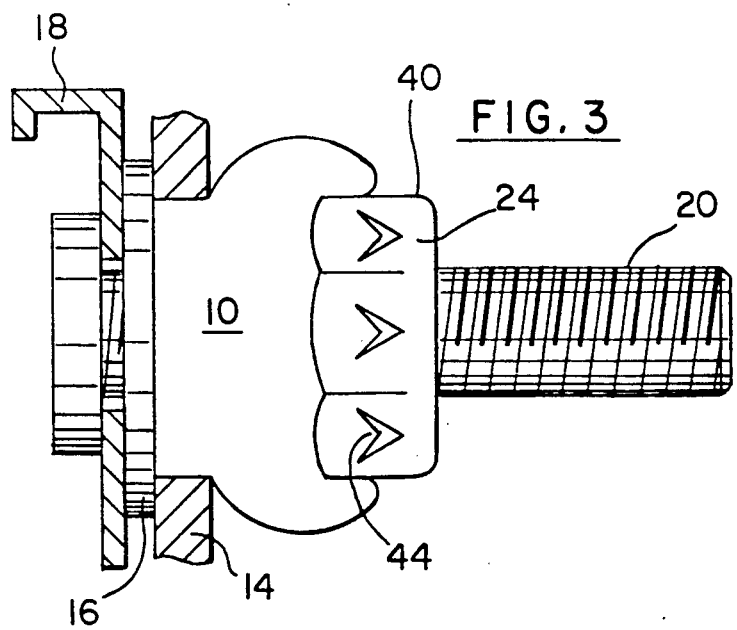
FIG. 3 is a side view of the fastener in its fully clamped position.

As the screw is tightened the reduced diameter bushing portion is compressively forced inwardly against the screw. Further tightening causes the larger diameter portion of the bushing to bulge outwardly (FIG. 3) with the bulge flowing over the open end of the cap (which has an outer diameter 40 slightly less than the outer diameter 42 of the large diameter bushing portion) exerting an annular radially inward force against the open end of the end cap. This centers the end cap and prevents the cutting of an exposed edge of the bushing.

To hold the parts together the cap includes a number of punched in triangular catches 44 the metal end cap may be formed from flat stock or drawn and may be of steel, stainless steel or brass for example, which will cooperate with the neoprene to hold the end cap in position.

I claim:

1. A blind fastener comprising a compressible plastic bushing having a first cylindrical portion, a flange at one end of said first cylindrical portion and a second reduced diameter cylindrical portion at the other end of said first cylindrical portion, a metallic end cap located on said reduced diameter portion with said end portion fully inserted into said cap with the open end of said cap being selectively spaced form the opposed end face of said first cylindrical portion, said end cap including on the closed end thereof, an opening for receiving a mating screw, and wherein said reduced diameter has an inner diameter approximately the same as the outer diameter of the screw to be received by said end cap opening and said first cylindrical portion has an inner diameter larger than the outer diameter of the screw, so that when the screw is fully tightened said spacing will disappear and said first cylindrical portion will bulge outwardly and rearwardly over the peripheral portion of said adjacent end cap portion.

2. A blind fastener according to claim 1 further comprising means on said metallic end cap for preventing the removal of said end cap from said reduced diameter portion.

* * * * *